United States Patent Office 3,493,479
Patented Feb. 3, 1970

3,493,479
METHOD OF PREPARATION OF ARYLCHLORO SILANES
Alexandr Vasiljevich Zimin, Lidia Pavlovna Sidorova, Anna Dmitrievna Verina, Antonina Vasiljevna Gubanova, and Valentina Ivanovna Savushkina, Moscow, U.S.S.R., assignors to Nauchno-Issledovatelsky Fiziko-Khimichesky Institute im. L. Ja. Karpova, Moscow, U.S.S.R.
No Drawing. Filed Jan. 4, 1965, Ser. No. 423,321
Int. Cl. B01j 1/10
U.S. Cl. 204—158                    11 Claims

ABSTRACT OF THE DISCLOSURE

Method of preparing mono-silyl derivatives of benzene having the general formula $$R'_{3-n}R''SiCl_n$$

and bis-silyl derivatives of benzene having the general formula $$(R'_{3-n}SiCl_n)_2C_6X_4$$

where R' is methyl or aryl, R'' is aryl, chloroaryl, fluoroaryl or chlorofluoroaryl, X is hydrogen or fluorine and $n$ has a value of from 1 to 3, consisting in the interaction of a halogenated benzene with (hydride, organohydride)-chlorosilanes including chlorosilane hydrides, methyl chlorosilane hydrides and aryl chlorosilane hydrides, the interaction occurring under gamma-ray irradiation having an energy of 0.5 to 2.0 mev. at a temperature of 150–300° C. and under a pressure of 20–60 atmospheres in an atmosphere of an inert gas, preferably nitrogen.

---

This invention relates to the process for the preparation of organochlorosilanes including mono, silyl derivatives of benzene having the general formula $$R'_{3-n}R''SiCl_n$$

and bis-silyl derivatives of benzene having the general formula $$(R'_{3-n}SiCl_n)_2C_6X_4$$

where R' is selected from the group consisting of methyl and aryl, R'' is selected from the group consisting of aryl, chloroaryl, fluoroaryl and chlorofluoroaryl, X is selected from the group consisting of hydrogen and fluorine, and $n$ has a value of from 1 to 3.

Some organochlorosilanes, viz., aryl-, diaryl-, aryl (alkyl)-chlorosilanes have found extensive applications in the production of electric insulating materials, heat carriers and heat-resistant plastics. Other organochlorosilanes referred to hereinabove are in low demand due to the complexity or impossibility of their production by the known processes.

A process is known in which arylchlorosilanes are prepared by passing a mixture of chlorobenzene with trichlorosilane or methyl dichlorosilane in the gas phase at a temperature from 500 to 600° C. over a catalyst.

Said process requires high temperatures which involve corrosion hazards. Another drawback of this method is in the formation of large quantities of by-products which reduce the yield of the product compound and complicate the process of the fractional distillation of the reaction mixture to obtain the end product of the required purity.

Some arylchlorosilanes are prepared by irradiating the starting compounds with high-energy electrons. This process, however, is not suitable for commercial use due to the fact that it is impractical to construct commercial units of reasonable efficiency and also because the reaction mixture contains a wide range of chlorosilanes so that the yield and purity of the product compound will be low.

The object of this invention is to develop a process for the preparation of organochlorosilanes of high purity.

Another object of the invention is to elaborate a process for manufacturing a wide range of organochlorosilanes.

A further object of this invention is to provide a simple, efficient, and easily controllable process for the production of organochlorosilanes.

These, together with the other objects of the invention, have been accomplished by reacting benezene halogenated by chlorine or chlorine fluoride with chlorosilane hydride, methylchlorosilane hydride or arylchlorosilane hydride, said interaction involving the irradiation of reactants with gamma-rays having a gamma-quantum energy of from 0.5 to 2.0 mev., and said results being maintained at a temperature of from 150 to 300° C. and a pressure from 20 to 60 kg./sq. cm. in an inert gas, preferably nitrogen. Homogenous mixtures of the starting materials are used for the production of perchloroaryl- or perchlorofluoroaryl chlorosilanes.

The process of the invention makes it possible to carry out the synthesis of organochlorosilanes in one stage and can be easily adapted for commercial production. The process is easy to control. The synthesis can be carried out both under static conditions or in a flow reactor.

The process of this invention provides high-purity products and has an added advantage in being capable of providing such products that can not be obtained by the known techniques, e.g., fluoroarylchlorosilanes.

To more fully illustrate the invention the following examples are presented.

EXAMPLE 1

Preparation of phenyltrichlorosilane. In a metallic ampoule 135 g. of trichlorosilane ($HSiCl_3$) and 112.5 g. of chlorobenzene ($C_6H_5Cl$) were placed. The ampoule was closed and the mixture was purged with nitrogen to remove oxygen. A pressure of 20 kg./sq. cm. was built up and the contents heated to a temperature of from 170 to 180° C. A $Co^{60}$ gamma-ray source was used to irradiate the mixture for five hours at a radiation intensity of 300 rad/sec. g. the reaction products being phenlytrichlorosilane and hydrogen chloride. To release the excessive pressure of hydrogen chloride the ampoule was furnished with a reflux condenser and safety valve.

About 90% of the starting material were converted The average "G yield" of phenyl trichlorosilane was 400 number of molecules formed per 100 ev. energy absorbed.

EXAMPLE 2

Preparation of diphenyldichlorosilane. In a metallic ampoule 177 g. of phenyldichlorosilane ($C_6H_5SiHCl_2$) and 112.5 g. of chlorobenzene ,$C_6H_5Cl$) were placed and the reaction carried out as described in Example 1, but the temperature was from 280 to 300° C. Irradiation of the reaction mixture yielded diphenyldichlorosilane.

About 80% of chlorobenzene was converted to the final product.

The average "G yield" of diphenyldichlorosilane was 150.

EXAMPLE 3

Preparation of methylphenyldichlorosilane. In a metallic ampoule were placed 115 g. of methyldichlorosilane ($CH_3SiHCl_2$) and 225 g. of chlorobenzene. The ampoule was closed and the process carried out as described in Example 1 but the reaction temperature was from 280 to 300° C. and the pressure of 40 kg./sq. cm. Methylphenyldichlorosilane was formed.

About 60% of the starting methyldichlorosilane was converted to methylphenyldichlorosilane.

The average "G yield" of the product was 150.

EXAMPLE 4

Preparation of bis (trichlorosilyl) benzene. In a metallic ampoule were placed 271 g. of trichlorosilane ($HSiCl_3$) and 147 g. of para-dichlorobenzene (p-$C_6H_4Cl_2$).

The process was carried out as described in Example 1, but the reaction temperature was 300° C. and the pressure—60 kg./sq. cm.

Bis-(trichlorosilyl) benzene was formed, the average "G yield" being 100. The conversion percentage was about 50%.

EXAMPLE 5

Preparation of para-dimethylchlorosilylchlorobenzene.

In a metallic ampoule were placed 147 g. of para-dichlorobenzene (p-$C_6H_4Cl_2$) and 343 g. of dimethylchlorosilane ($(CH_3)_2SiHCl$).

The procedure was the same as in Example 1 but the reaction temperature was 250° C. and the pressure 40 kg./sq. cm. Irradiation yielded para-dimethylchlorosilylchlorobenzene ($(CH_3)_2SiClC_6H_4Cl$).

The average "G yield" of the product was about 50. The percentage of para-dichlorobenzene conversion to the product compound was about 15.

EXAMPLE 6

Production of bis (trichlorosilyl) tetrafluorobenzene.

In a metallic ampoule were placed 219 g. of ortho-tetrafluorodichlorobenzene (ortho-$C_6F_4Cl_2$) and 546 g. of trichlorosilane ($HSiCl_3$). The procedure was the same as in Example 1 but the temperature was 250° C. and a pressure 40 kg./sq. cm.

Irradiation yielded bis (trichlorosilyl) tetrafluorobenzene ($C_6F_4(SiCl_3)_2$).

The average "G yield" was 60. About 25% of the starting ortho-tetrafluorodichlorobenzene was converted to the final product.

EXAMPLE 7

Production of trichlorosilyldichlorobenzene.

In a metallic ampoule were placed 181 g. of 1,2,4-trichlorobenzene (1,2,4-$C_6H_3Cl_3$) and 160.5 of trichlorosilane ($HSiCl_3$). The procedure was the same as in Example 1.

Irradiation—yielded trichlorosilyl dichlorobenzene ($C_6H_3Cl_2SiCl_3$)

The average "G yield" of the product was 70. About 25% of the starting trichlorobenzene was converted to the product compound.

What we claim is:

1. A method of preparing mono-silyl derivatives of benzene having the general formula $$R'_{3-n}R''SiCl_n$$

and bis-silyl derivatives of benzene having the general formula $$(R'_{3-n}SiCl_n)_2C_6X_4$$

where R' is selected from the group consisting of methyl and aryl, R" is selected from the group consisting of aryl, chloroaryl, fluoroaryl and chlorofluoroaryl, X is selected from the group consisting of hydrogen and fluorine, and $n$ has a value ranging from 1 to 3, consisting in the interaction of a halogenated benzene wherein at least one of said halogen groups is chlorine with a material selected from the group consisting of chlorosilane hydrides, methyl chlorosilane hydrides and aryl chlorosilane hydrides, on irradiating with gamma-rays and heating at a temperature of 150° to 300° C. and under a pressure sufficient to effect the reaction.

2. A method according to claim 1 wherein said halogenated benzene is a chlorinated benzene.

3. A method according to claim 1 wherein said halogenated benzene is chlorinated, fluorinated benzene.

4. A method of preparing mono-silyl derivatives of benzene having the general formula $$R'_{3-n}R''SiCl_n$$

where R' is selected from the group consisting of methyl and aryl, R" is selected from the group consisting of aryl, chloroaryl, fluoroaryl and chlorofluoroaryl, and $n$ has a value ranging from 1 to 3, consisting in the interaction of a homogeneous mixture of a halogenated benzene wherein at least one of said halogen groups is chlorine with a material selected from the group consisting of chlorosilane hydrides, methyl chlorosilane hydrides and aryl chlorosilane hydrides, said interaction involving irradiation with gamma-rays having an energy of 0.5 to 2.0 mev., at a temperature of 150–300° C. and under a pressure of 20–60 atm. in an atmosphere of an inert gas.

5. A method as claimed in claim 4 wherein said halogenated benzene is a chlorinated benzene.

6. A method as claimed in claim 4 wherein said halogenated benzene is a chlorinated, fluorinated benzene.

7. A method as claimed in claim 4 wherein said inert gas is nitrogen.

8. A method of preparing bis-silyl derivatives of benzene having the general formula $$(R'_{3-n}SiCl_n)_2C_6X_4$$

where R' is selected from the group consisting of methyl and aryl, X is selected from the group consisting of hydrogen and fluorine and $n$ has a value ranging from 1 to 3, consisting in the interaction of halogenated benzene wherein at least two of said halogen groups are chlorine with a material selected from the group consisting of chlorosilane hydrides, methyl chlorosilane hydrides and aryl chlorosilane hydrides, said interaction involving irradiation with gamma rays having an energy of 0.5 to 2.0 mev., at a temperature of 150–300° C. and under a pressure of 20–60 atm. in an atmosphere of an inert gas.

9. A method as claimed in claim 8 wherein said halogenated benzene is a chlorinated benzene.

10. A method as claimed in claim 8, wherein said halogenated benzene is a chlorinated, fluorinated benzene.

11. A method as claimed in claim 8 wherein said inert gas is nitrogen.

References Cited

UNITED STATES PATENTS

| | | | |
|---|---|---|---|
| 2,405,019 | 7/1946 | Dalin | 204—158 X |
| 3,270,070 | 8/1966 | Haszeldine et al. | 204—158 X |

OTHER REFERENCES

Martin, Chemical and Engineering News, Vol. 33 (April 1955) pages 1425 and 1428.

HOWARD S. WILLIAMS, Primary Examiner